Patented Apr. 23, 1940

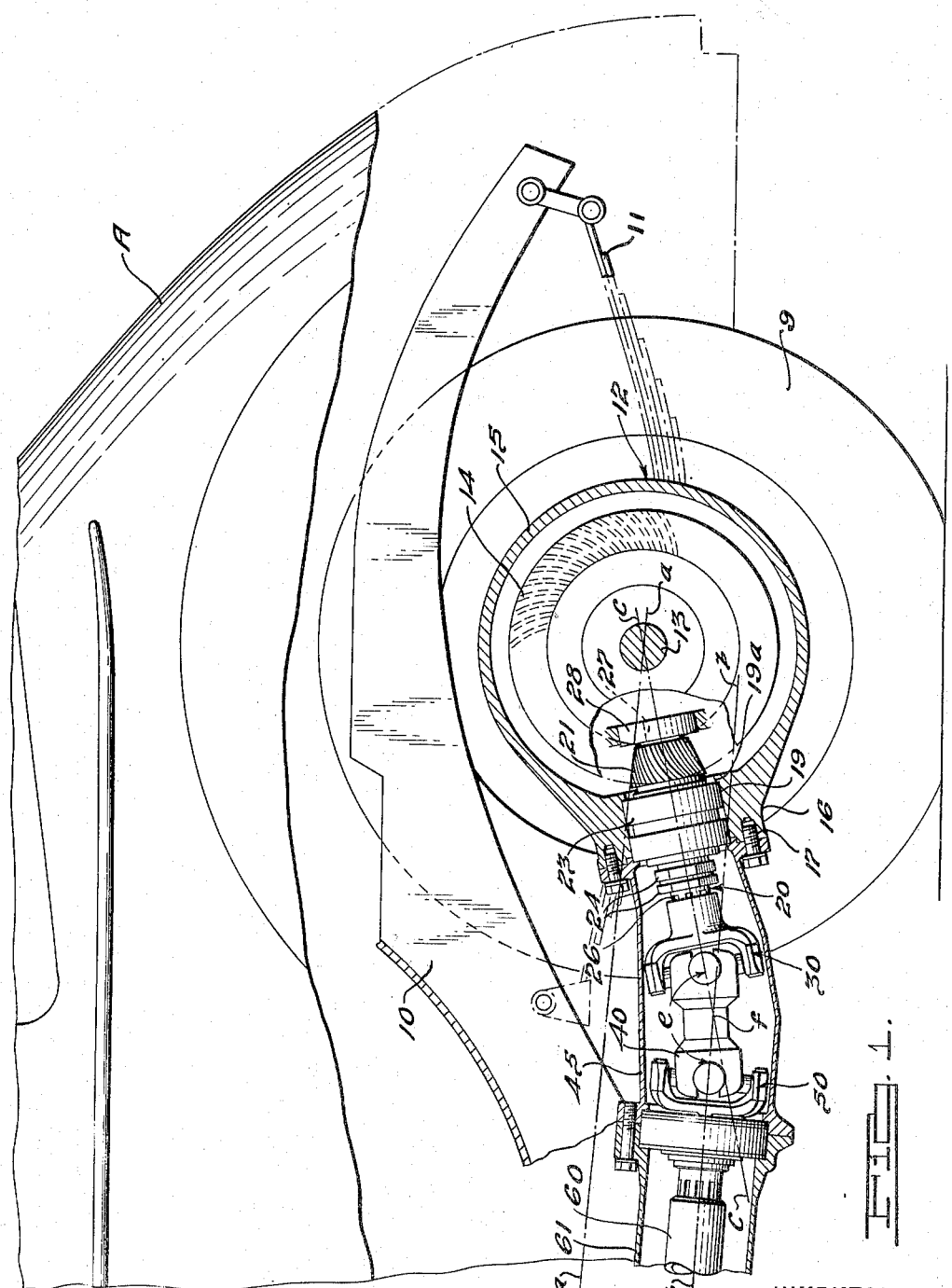

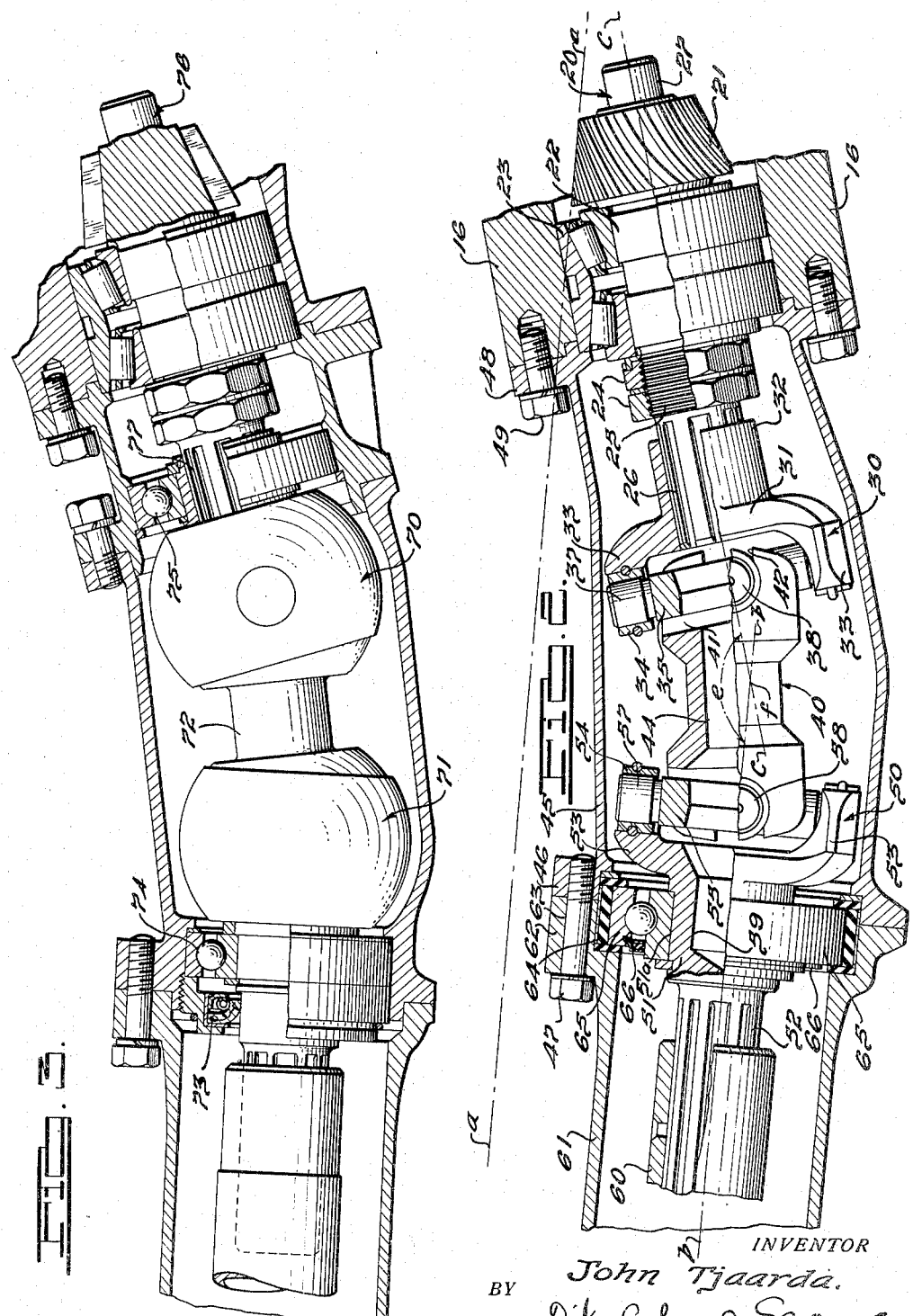

2,198,352

UNITED STATES PATENT OFFICE 2,198,352

MOTOR VEHICLE

John Tjaarda, Birmingham, Mich., assignor to Briggs Manufacturing Company, Detroit, Mich., a corporation of Michigan Application June 15, 1936, Serial No. 85,219

13 Claims. (Cl. 180—73)

This invention relates to motor vehicles and more particularly to such motor vehicles as have their engines mounted at the opposite end from the driving wheels, such, for instance, as motor vehicles having front mounted engines and rear mounted final drives.

Mounting engines at the opposite end from the driving wheels of motor vehicles has been a conventional practice since the very advent of the motor vehicle. Mounting the engine and the driving wheels at the same end, either at the front or the rear of a motor vehicle, has not yet become a universally accepted practice and to a large extent still remains in an experimental stage, exemplifying attempts to eliminate a number of serious disadvantages which have been considered inherent to the separate mounting of the engine and driving wheels. Said difficulties become more and more apparent as the construction of motor vehicles improves and high driving speeds become common.

According to the customary practice the power transmitting means from the engine at one end of the vehicle to the driving wheels at the other end are of mechanical character and they are usually exemplified by a shaft, termed the propeller shaft. In some of the conventional structures the engine is mounted at the front of the vehicle frame and has its crankshaft rigidly and rotatably supported by the frame; the transmission is rigidly affixed to the transverse frame members, its drive shaft (called the transmission shaft) being in central alinement with the crankshaft of the engine; driving wheels are mounted at the rear axle of the vehicle and are driven by a final drive which is usually of the spiral bevel gear type. The transmission shaft is bodily stationary with respect to the frame, while the final drive is secured to the rear axle which is sprung at the frame and is movable with respect thereto. The transmission shaft and the final drive are usually connected with the aid of the propeller shaft having a universal joint at its transmission end, and sometimes at both the transmission and the final drive ends. The height at which the propeller shaft is located is determined by the respective elevations of the transmission and the rear axle, since the center line of the propeller shaft crosses the center lines of the transmission shaft and of the rear axle.

There is a certain minimum height below which it is impracticable to lower the transmission or the rear axle. On the other hand, it is clear that the propeller shaft determines the elevation of the surface of the floor of the passenger compartment of a vehicle. As the driving speeds increase, safety requirements necessitate designing motor vehicles on such a plan that the center of gravity thereof is located as low as possible, thus increasing the stability of the vehicles, one of the most effective ways to effect such lowering of the center of gravity being the lowering of the body of a vehicle. However, such lowering of the body is interfered with because of the presence of the propeller shaft. It has been customary in many automobiles to provide an arched tunnel open at its bottom and extending longitudinally along the center line of the floor structure of the vehicle body, said tunnel being adapted to house the propeller shaft and the torque tube in which the same is included. Considering the fact that the height of such tunnel has to be sufficient to permit movements of the propeller shaft caused by its following with its rear end the movements of the sprung rear axle, it will be appreciated that presence of such an arched tunnel in the floor structure of the passenger compartment is highly objectionable as interfering with the comfortable use of the compartment. Eliminating the propeller shaft entirely by mounting both the engine and the driving wheels at the same end of the vehicle, such as is done in front drive vehicles or in the rear mounted engine vehicles, is in fact designing a motor vehicle on a plan which has not yet been verified by public use to such an extent as to warrant discarding present designs and factory equipment and retooling the plants for mass manufacture of such types of motor vehicles.

It is one of the objects of the present invention to provide a novel motor vehicle which has a rear axle drive and an engine mounted at the front, and in which the floor structure of the passenger compartment is lowered much more than it is possible to do with the given elevation of the transmission and the rear axle without providing an arched tunnel in the floor structure of the vehicle.

Another object of the invention is to provide a novel motor vehicle of greatly increased stability and in which the diameter of the wheels is not decreased beyond practical requirements.

A still further object of the invention is to provide a novel motor vehicle with the engine and the driving wheels thereof mounted at the opposite ends of the vehicle, such vehicle having novel mechanical means for transmitting power from the engine to the final drive, which means permit a very low position of the floor structure with respect to the other parts of the vehicle structure.

A further object of the invention is to provide a novel motor vehicle in which the power from the front mounted engine is transmitted to the rear mounted final drive along a substantially curvilinear path and under the floor structure of the passenger compartment of the vehicle.

A still further object of the invention is to provide a novel motor vehicle in which the prolonged center line of the propeller shaft passes at a substantial distance under the rear axle.

A still further object of the invention is to provide a novel mechanical power transmitting means for motor vehicles which means, while enabling the accomplishment of the above objects, is composed of a small number of parts, is simple in construction, cheap to manufacture, and is practical in use.

Other objects of this invention will appear in the following description and appended claims, reference being had to the accompanying drawings forming a part of this specification wherein like reference characters designate corresponding parts in the several views.

Fig. 1 is a side view, partly in section, of the rear portion of a motor vehicle embodying my invention.

Fig. 2 is a sectional view showing the multiple universal joint connecting the propeller shaft and the final drive shaft.

Fig. 3 is a sectional view showing a modified form of the multiple universal joint.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is shown, by way of example, a rear driven motor vehicle having an engine (not shown) mounted at its front, said vehicle having a rear mounted final drive of the spiral bevel gear type. However, it is to be expressly understood that my invention is not limited to rear driven motor vehicles or to any particular type of drive, and that it is capable of being applied to motor vehicles having other types of drives such as worm and gear drive, or to vehicles having different types of engine and driving axle mountings.

Referring more particularly to Figs. 1 and 2 wherein the preferred embodiment of my invention is illustrated, A indicates generally the body of a motor vehicle of the character mentioned, having a frame 10 which is sprung by means of suitable springs such as 11, said spring being supported by the driving rear axle 12, carrying suitable driving wheels 9. The wheels are driven by the axle shafts, such as shaft 13, which are operatively connected with the aid of a suitable differential (not shown) having a suitable final drive, such as a bevel gear drive with the ring gear 14. The final drive is enclosed in a suitable housing 15 which has a forwardly protruding extension 16 provided with a number of internally threaded screw-receiving holes 17, and a bearing receiving recess 19, extending up to a shoulder 19a, into which recess is pressed a suitable bearing supporting the pinion drive shaft indicated generally by the numeral 20.

The shaft 20 has at its rear end a suitable spiral bevel pinion 21 preferably formed integrally thereon, said pinion meshing with the spiral bevel ring gear 14. The middle portion of the shaft 20 is turned down to a proper diameter to carry by friction the inner ring of a double row roller bearing 23, pressed into the recess 19, as mentioned. The bearing 23 is adapted to resist both the radial load and the end thrust to which the shaft 20 may be subjected in operation. Retaining nuts 24, 24, engaging an externally threaded portion 25 of the shaft 20 hold said shaft firmly set with respect to the bearing 23 and serve as adjusting means. The forward end of the shaft 20 is externally splined as shown at 26, while its rear or tail end 27 is adapted to be supported in a suitable bearing, such as a roller bearing 28.

In contravention to the customary practice in the art, the shaft 20, although having its center intersecting the center line of the axle shaft, is set at a certain angle with the horizontal, its forward end, that is the end on the propeller shaft side, is set lower than its pinion carrying end, in consequence whereof its center line forms an angle with the center line of the propeller shaft. Said angle may vary within certain limits, the preferred angle being about fifteen to twenty degrees.

The splined end 26 of the shaft 20 carries a universal joint 30 which joint is operatively connected by means of a member 40 with a second universal joint 50, which joint is supported in a suitable bearing and is in operative engagement with a propeller shaft 60. Said propeller shaft is connected to the transmission shaft (not shown) and transmits power from the engine to the final drive ring gear 14 through said interconnected universal joints 50 and 30, and the shaft 20. The propeller shaft 60 is housed in a suitable torque tube 61 which is provided with a flange 62 having a plurality of bolt holes 63 and a bearing receiving recess 64 into which is pressed a resiliently mounted roller bearing 65. The torque tube 61 and the differential housing 15 are connected together by means of a torque tube extension or curvilinear casing 45 adapted to house said universal joints 30 and 50. Said casing 45 has at its front and rear extremities suitable flanges 46 and 48 having a plurality of holes corresponding to bolt and screw holes in the flanges 62 and 16 and secured thereto by bolts 47 and 49, thus providing a secure connection of the casing 45 to the torque tube 61 and to the differential housing 15. A suitable grease seal 66, is provided at the bearing 65 in order to prevent the grease filling the interior of the casing 45 and of the differential housing 15 from passing into the torque tube 61.

By virtue of the above construction the center line b—b of the propeller shaft 60 passes considerably below the line a—a connecting the respective centers of the rear end of the transmission shaft and the ring gear 14, and the universal joints connecting the propeller and the final drive shafts are located below the point of contact of the gears of the final drive. Said line b—b intersects the center line c—c of the shaft 20 at the point f, which point is the vertex of the included angle e formed by said lines. It is an important feature of my invention that the actual center line of the propeller shaft, which in conventional structures is made substantially coincident with the line connecting the respective centers of the rear end of the transmission shaft and of the ring gear, is in my novel structure separated from said theoretical line and is caused to pass considerably below the same, as is clearly indicated in Fig. 1. The distance between said lines in my novel structure represents substantially the distance through which the middle portion of the frame and of the vehicle body may be lowered for the purpose of increasing the stability of the vehicle at high speeds and for eliminating the arched tunnel in the floor of the passenger compartment of the vehicle. It will be understood that the plane of the floor of the vehicle body may extend substantially at or below the line a—a.

In the present embodiment of the invention, there are two universal joints provided between the propeller shaft 60 and the final drive shaft 20. However, I do not desire to limit myself to that number, since in many instances the provision of more than two universal joints may be equally practical and advantageous.

Any suitable construction of universal joints may be employed. In the preferred embodiment shown in Figs. 1 and 2 the universal joints are of the mechanical angular type with fork and star-shaped pins. The joints used are preferably substantially similar in construction. The joint 30 comprises a fork-shaped member 31 having a bored and internally splined end 32 engaging the externally splined end 26 of the shaft 20. The fork arms 33, 33, of said member 31 are provided with suitably secured bushings 34 in which are journalled the lugs 37, 37 of the star-shaped pin 35. Said pin 35 engages with a pair of lugs 38, 38 a connecting member 40. The pin-engaging extremities of said member 40 are provided with longitudinal intersecting slots 41 and 42, slot 41 being cut deep enough to clear in operation the star-shaped pin 35. The slot 42 is adapted to receive the lugs 38, 38 of said pin 35.

The opposite extremity of the member 40 is symmetrical to the above described extremity, and it engages lugs 58, 58 of the star-shaped pin 55 which pin engages with its lugs 57, 57 the fork arms 53, 53 of the fork-shaped member 51. Bearing bushings 54, 54 are similar to those indicated by 34, 34 in the member 31. For the purpose of making the structure lighter, the member 31 is drilled out and chamfered as indicated at 59, while the member 40 is bored through as at 44. The inner ring of the bearing 65 is held by friction at the turned portion 51a of said member 51. The tail end 52 of said member 51 is externally splined in order to engage the internally splined hole provided in the rear extremity of the propeller shaft 60.

In the modified structure shown in Fig. 3, the universal joints 70 and 71 are of the ball and socket type, and they are connected by means of a member 72 corresponding to the connecting member 40 of the preferred structure. A felt grease seal such as indicated by the numeral 73 is provided at bearing 74. The universal joint 70 is provided with an additional ball bearing, such as 75, giving additional support to said joint and to the splined end of the pinion shaft 76 engaging the internally splined end 77 of said universal joint 70. The construction is otherwise substantially the same as the previous embodiment.

Thus, considered from one of its broader aspects, my invention contemplates providing a novel motor vehicle with its engine and final drive mounted at opposite ends of the vehicle, power being transmitted from the engine to the final drive with the aid of a propeller shaft which is provided at one or both of its extremities with a plurality of universal joints, which construction permits considerable lowering of the position of the propeller shaft and of the passenger compartment of the vehicle. By the above described simple means many important advantages are accomplished, and motor vehicles with the engine and final drive mounted at opposite ends become better adapted for high speeds.

Although only two embodiments of my invention have been illustrated and described, numerous modifications in the form and the relative arrangement of parts may now be made by those skilled in the art without departing from the scope of my invention. For instance, universal joints of different construction, such as flexible disc joints, may be employed. Sections of flexible shafting may be used instead of the universal joints.

I claim:

1. In a motor vehicle, a rear mounted final drive of the gear and pinion type, and a propeller shaft adapted to transmit power to said final drive, said propeller shaft being located below the theoretical straight line of drive and having at its rearmost extremity two interconnected universal joints transmitting power to the final drive along a curvilinear path below the floor of the vehicle body.

2. In a motor vehicle, a propeller shaft and final drive shaft, said propeller shaft and said final drive shaft being set at an angle with the horizontal and forming an included angle of less than 180 degrees, the vertex of said included angle being directed downwardly, and a plurality of interconnected universal joints operatively connecting said propeller shaft and said final drive.

3. In a motor vehicle, a propeller shaft and final drive shaft, said propeller shaft and said final drive shaft being set at an included angle of less than 180 degrees, the vertex of said included angle being directed downwardly, a plurality of interconnected universal joints operatively connecting said propeller shaft and said final drive, and a rigid inclined casing for housing said universal joints.

4. In a motor vehicle, a propeller shaft and final drive shaft, said propeller shaft and said final drive shaft being set at an included angle of less than 180 degrees, the vertex of said included angle being directed downwardly, a plurality of interconnected universal joints operatively connecting said propeller shaft and said final drive, and a rigid inclined curvilinear casing for housing said universal joints, said casing being provided at its propeller shaft side with a grease seal.

5. In a motor vehicle, a final drive housing, a rear axle, a final drive shaft extending perpendicularly with respect to the axle and at a downward angle to the horizontal, a propeller shaft, universal joint means connecting said shafts at an included angle of less than 180 degrees, and a housing for said means fixed to said final drive housing.

6. In a motor vehicle, a final drive housing, a rear axle, a final drive shaft extending perpendicularly with respect to the axle and at a downward angle to the horizontal, a propeller shaft, universal joint means connecting said shafts at an included angle of less than 180 degrees, and a housing for said means fixed to said final drive housing and inclined downwardly and forwardly.

7. In a motor vehicle, a transverse rear axle, a final drive housing associated therewith, a final drive shaft operatively connected to the axle and extending forwardly and downwardly therefrom at an angle to the horizontal, a propeller shaft having its major axis forming with respect to the major axis of the final drive shaft an included angle of less than 180 degrees, a tubular housing for the propeller shaft, a plurality of universal joints drivingly connecting said shafts, and a tubular housing for said joints, all of said housings being fixed together.

8. In a motor vehicle, a transverse rear axle, a final drive housing associated therewith, a final drive shaft operatively connected to the axle and extending forwardly and downwardly therefrom at an angle to the horizontal, a propeller shaft having its major axis forming with respect to the major axis of the final drive shaft an included angle of less than 180 degrees, a tubular housing for the propeller shaft, a plurality of universal joints drivingly connecting said shafts, and a tubular housing for said joints, said last named housing being rigidly secured to an angular extension of the final drive housing and to the end of the propeller shaft housing.

9. In a motor vehicle, a final drive housing, a driven rear axle, a propeller shaft having its major axis extending on a line below the axle, a plurality of universal joints drivingly connecting the propeller shaft and axle, a housing for said joints fixed with respect to said final drive housing, and bearing means for said joints adjacent opposite ends of said second named housing.

10. In a motor vehicle, a final drive housing, a driven rear axle, a propeller shaft having its major axis extending on a line below the axle, a plurality of universal joints drivingly connecting the propeller shaft and axle, a housing for said joints fixed with respect to said final drive housing, and bearing means for said joints adjacent opposite ends of said second named housing, said joints being free of engagement with their housing.

11. In a motor vehicle having a driving axle, a final drive shaft drivingly connected to said axle and extending forwardly and downwardly therefrom, a propeller shaft for transmitting power to said drive shaft, said shafts forming an inclined angle of less than 180 degrees with the vertex thereof directed downwardly, and a universal connection between said propeller shaft and said final drive shaft.

12. In a motor vehicle having a driving axle, a final drive of the bevel gear type including a final drive shaft drivingly connected to said axle, said drive shaft being arranged perpendicularly with respect to the driving axle and extending forwardly and downwardly therefrom, a propeller shaft transmitting power to said drive shaft, the center lines of said propeller shaft and of said drive shaft intersecting at a point below the center line of the rear axle, and a universal connection between said propeller shaft and said final drive shaft.

13. In a motor vehicle having a driving axle mounted at its rear, driving means for said axle, said means including a ring gear, a pinion engaging said gear and a drive shaft carrying said pinion and located at the driving axle at a right angle thereto; a propeller shaft transmitting power to said driving means; the center line of said drive shaft extending forwardly and downwardly of the center line of said driving axle, with the center lines of said drive shaft and said propeller shaft forming an angle of less than 180 degrees with the vertex theroef being directed downwardly; and a universal driving connection between said propeller shaft and said final drive shaft.

JOHN TJAARDA.